United States Patent
Luo et al.

(10) Patent No.: US 12,474,853 B2
(45) Date of Patent: Nov. 18, 2025

(54) USE OF MIMO IN MEMORY CONTROLLERS

(71) Applicant: Micron Technology, Inc., Boise, ID (US)

(72) Inventors: Fa-Long Luo, San Jose, CA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/734,270

(22) Filed: Jun. 5, 2024

(65) Prior Publication Data

US 2024/0411471 A1 Dec. 12, 2024

Related U.S. Application Data

(60) Provisional application No. 63/507,160, filed on Jun. 9, 2023.

(51) Int. Cl.
*G06F 3/06* (2006.01)

(52) U.S. Cl.
CPC .......... *G06F 3/0647* (2013.01); *G06F 3/0604* (2013.01); *G06F 3/0683* (2013.01)

(58) Field of Classification Search
CPC .... G06F 3/0647; G06F 3/0604; G06F 3/0683; G06F 3/0646; G06F 3/0653; G06F 2003/0697; G06F 3/067; G06F 3/0671; G06F 3/0668; G06F 3/0659; G06F 3/0658; G06F 3/0656
See application file for complete search history.

(56) References Cited

U.S. PATENT DOCUMENTS

| | | | |
|---|---|---|---|
| 2008/0188190 A1* | 8/2008 | Prasad | H04B 7/0617 455/114.3 |
| 2019/0065122 A1* | 2/2019 | Sato | A63F 13/235 |
| 2022/0121394 A1* | 4/2022 | Brewer | G06F 3/0619 |
| 2024/0319874 A1* | 9/2024 | Kim | G06F 3/0608 |

* cited by examiner

*Primary Examiner* — Khanh C Tran
(74) *Attorney, Agent, or Firm* — Dorsey & Whitney LLP (57) ABSTRACT

The present invention relates to a memory controller and a memory device that are configured to communicate with each other using multiple input multiple output (MIMO) technology. The memory controller includes a precoder that precodes data for transmission. The precoding is based on channel state information, a neural network, or both. The memory device receives the precoded data and decodes them to retrieve the original data. In some cases, the precoder uses the channel state information to optimize the precoding matrix for the given channel conditions. In some cases, a neural network is trained to predict the optimal precoding matrix for the current channel state. The precoding matrix is then used to encode the data, which is then transmitted to the memory device. The use of MIMO and precoding improves the reliability and efficiency of the communication between the memory controller and memory device.

20 Claims, 7 Drawing Sheets

USE OF MIMO IN MEMORY CONTROLLERS

CROSS REFERENCE TO RELATED APPLICATION(S)

This application claims the benefit under 35 U.S.C. § 119 of the earlier filing date of U.S. Provisional Application Ser. No. 63/507,160 filed Jun. 9, 2023 the entire contents of which are hereby incorporated by reference in their entirety for any purpose.

BACKGROUND

Multiple-input multiple-output (MIMO) communication is a technology used in wireless communication systems that employs multiple antennas at both the transmitter and the receiver to improve the data throughput and signal quality. In a MIMO system, the transmitter sends multiple data streams through multiple antennas, which are then received by multiple antennas at the receiver. By using signal processing techniques, MIMO systems can achieve higher data rates and improved reliability compared to single-antenna systems. MIMO technology has found widespread use in wireless communication standards such as Wi-Fi, LTE, and 5G. This technology has led to significant advances in wireless communication systems and has become an important research area in the field of wireless communication.

In computer systems, memory devices (e.g., non-volatile or volatile) are commonly used to store and retrieve data. These memory devices typically communicate with a memory controller, which manages the flow of data between the memory device and other components of the system. The communication between the memory device and the memory controller is facilitated by one or more buses, which provide a communication pathway for the transfer of data and control signals. The memory controller is responsible for coordinating the transfer of data to and from the memory device, as well as managing various aspects of the memory device's operation, such as addressing and refresh cycles. Efficient communication between the memory device and memory controller may be important for reliable and speedy access to data, particularly in high-performance computing environments.

DETAILED DESCRIPTION

Certain details are set forth below to provide a sufficient understanding of embodiments of the present disclosure. However, it will be clear to one skilled in the art that embodiments of the present disclosure may be practiced without various knowledge of these particular details. In some instances, well-known wireless communication components, circuits, control signals, timing protocols, computing system components, and software operations have not been shown in detail in order to avoid unnecessarily obscuring the described embodiments of the present disclosure.

Examples described herein include the use of multiple input multiple output (MIMO) communications between memory controllers and memory devices. Memory devices may include volatile memory, non-volatile memory, or both. Current solutions for communications between memory controllers and memory devices include physical interfaces such as buses, which transfer data between a memory controller and a memory device. However, MIMO has various advantages and features that may be useful when implemented in communications between memory controllers and memory devices. For example, MIMO can provide higher data rates for communication, increased overall data throughput, improved reliability in communication by using redundancy in the form of multiple channels, lower power consumption as power is distributed across multiple antennas or channels, and increased communication range between the memory controller and memory device without signal degradation.

Prior to a MIMO transmission, a precoder at the transmission device may estimate the channel response, which describes how the channel affects the transmitted signal, taking into account various factors such as attenuation, noise, and interference, to generate a precoder matrix. The precoder matrix may be applied to the MIMO transmission so the receiver device receives the original transmission (with some noise or interference). In some embodiments of the disclosure, the precoder may utilize pilot signals and received channel state information (CSI) to determine the precoder matrix or may utilize a neural network to determine the precoder matrix.

Figure 1:
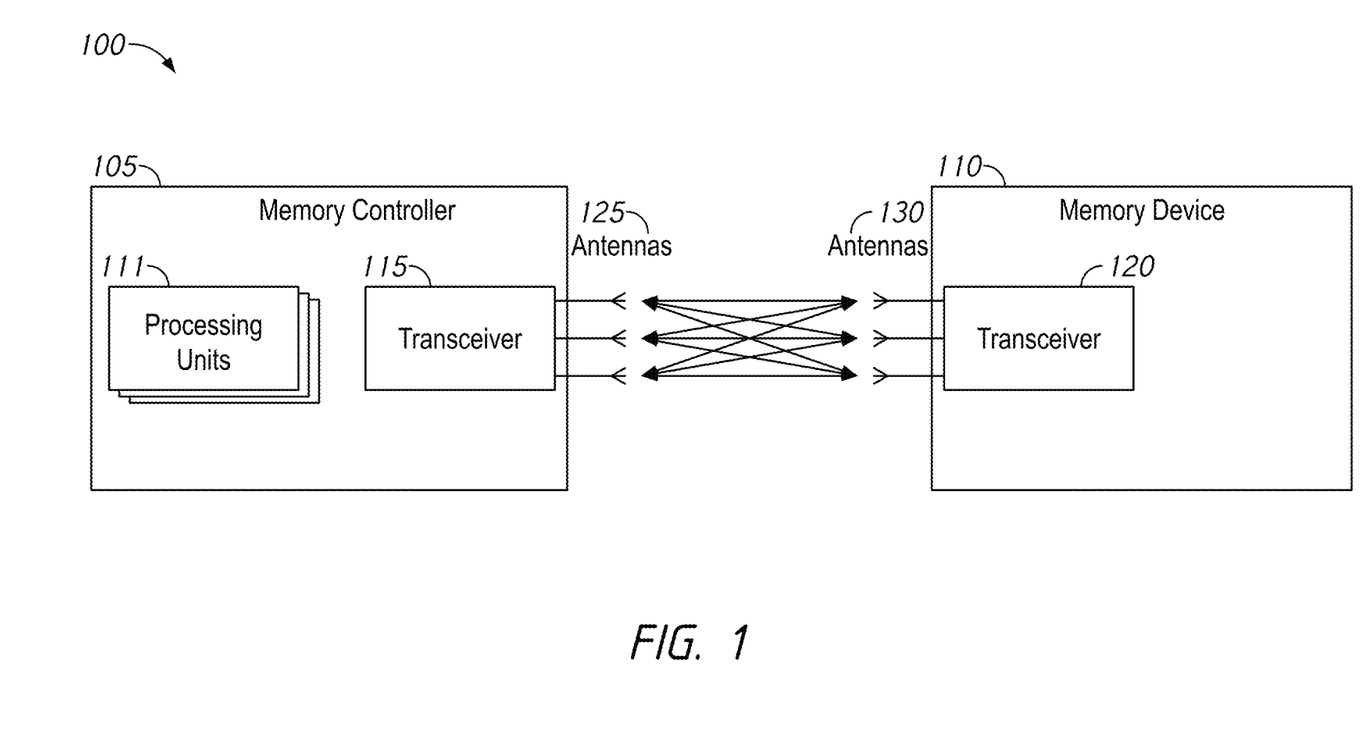
FIG. 1 is a block diagram of a communications system arranged in accordance with examples described herein.

FIG. 1 is a block diagram of a communications system 100 arranged in accordance with examples described herein. Communications system 100 includes memory controller 105 which includes transceiver 115, and memory device 110 which includes transceiver 120. In some cases, transceiver 115 may be a transmitter, a receiver, or both. In some cases, transceiver 120 may be a transmitter, a receiver, or both. The transceiver 115, transceiver 120, or both, may include one or more antennas 125 and 130, respectively. The transceiver 115, transceiver 120, or both, may be implemented on a reconfigurable fabric, and may include one or more processing units and control instructions. The control instructions may be stored on non-transitory computer readable media (not shown), for example, as encoded executable instructions, which, when executed by a processor (e.g., a reconfigurable fabric) (not shown), is configured to cause the transceiver 115, transceiver 120, or both, to perform certain operations described herein. In some examples, the memory controller 105 and memory device 110 may be located on the same device (e.g., co-located), or may be located on different devices (e.g., a user equipment, a base station). In some examples, the memory controller 105 may include one or more processing units 111. Processing units 111 may be described in further detail in at least FIG. 4. Additionally or alternatively, an electronic device that includes memory controller 105 may include one or more processing units 111 located outside memory controller 105.

Electronic devices described herein, such as memory controller 105 and/or memory device 110 shown in FIG. 1 may be implemented using generally any electronic device for which wireless communication capability is desired. For example, memory controller 105 and/or memory device 110 may be implemented using a mobile phone, smartwatch (or other wearable device), computer (e.g. server, laptop, tablet, desktop), or radio. In some examples, the memory controller 105 and/or memory device 110 may be incorporated into and/or in communication with other apparatuses for which communication capability is desired, including devices associated with the Internet of Things (IoT), such as but not limited to, an automobile, airplane, helicopter, appliance, tag, camera, or other device. While not explicitly shown in FIG. 1, memory controller 105 and/or memory device 110 may include any of a variety of components in some examples, including, but not limited to, memory, input/output devices, circuitry, processing units (e.g. processing elements and/or processors), or combinations thereof.

The transceiver 115, transceiver 120, or both may each include multiple antennas. For example, the transceiver 115, transceiver 120, or both may each have more than two antennas. Generally any number of antennas may be used including 2, 3, 4, 5, 6, 7, 8, 9, 10, 11, 12, 13, 14, 15, 16, 32, 64, or 96 antennas, though other numbers of antennas may be pictured. Other numbers of antennas may be used in other examples. In some examples, the transceiver 115, transceiver 120, or both may have a same number of antennas. In other examples, the transceiver 115, transceiver 120, or both may have different numbers of antennas, as shown in FIG. 1. Generally, systems described herein may include MIMO systems.

MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 96) antennas to transmit and/or receive transmissions. As the number of antennas increase, so generally does the complexity involved in accurately transmitting and/or receiving transmissions. Although two electronic devices (e.g. memory controller 105 and/or memory device 110) are shown in FIG. 1, generally the system 100 may include any number of electronic devices.

MIMO may have various advantages and features that may be useful when implemented in communications between memory controllers and memory devices. For example, MIMO can provide higher data rates for communication. By using multiple antennas or channels, MIMO can increase overall data throughput. Devices that use MIMO communications may take advantage of spatial multiplexing, which involves transmitting multiple independent data streams simultaneously over the same frequency band using multiple antennas at both the transmitter and receiver. In other examples, MIMO can provide improved reliability in communication by using redundancy in the form of multiple channels. If one channel experiences interference or a signal loss, the data can still be transmitted and received over other channels. In some other examples, MIMO can provide lower power consumption as power is distributed across multiple antennas or channels. In some other examples, MIMO can provide increased communication range between the memory controller and memory device without signal degradation.

Devices that use MIMO communications using multiple antennas 125 or 130, such as memory controller 105 and/or memory device 110, may utilize precoding to transform the data to be transmitted in such a way that it is optimized for transmission over the MIMO channel. This may be accomplished by applying a matrix operation to the data before it is transmitted, which may map it onto the MIMO channel in a way that reduces interference and increases the signal-to-noise ratio (SNR).

MIMO communications between memory controller 105 and memory device 110 may be modeled using one or more equations. In some examples, the following equation may represent a receive signal based on a transmit signal:

$$Y = HX + n \qquad \text{Equation 1}$$

where:

$$H = \begin{bmatrix} h_{11} & \cdots & h_{1N_r} \\ \vdots & \ddots & \vdots \\ h_{N_t 1} & \cdots & h_{N_t N_r} \end{bmatrix} \qquad \text{Equation 2}$$

In Equation 1, X may represent the data for transmission by antennas 125, Y may represent the receive data for antennas 130, n may represent the noise or interference, and H may represent a channel response, which describes how the channel affects the transmitted signal, taking into account various factors such as attenuation, noise, and interference. More specifically, H may describe how the channel affects the transmitted signal by introducing attenuation and phase shifts at different frequencies. The channel response H may be a complex-valued matrix that takes into account both the magnitude and phase of the signal. H may be estimated using various techniques such as channel sounding, pilot signals, training sequences, or combinations thereof. The number of columns in H depends on $N_r$, or the number of antennas at the receiving side of a transmission. The number of rows in H depends on $N_t$, or the number of antennas a transmit side of a transmission.

In some cases, Equation 1 may take on the form:

$$Y = HPX + n \qquad \text{Equation 3}$$

In such cases, if P equals the inverse of H, then Y=X+n. Precoding involves multiplying the transmitted signals X by a matrix called a precoding matrix (e.g., P) before they are transmitted through the transmit antennas (e.g., 125 or 130). The precoding matrix may be designed to improve the system performance by taking into account the channel response matrix and the system requirements. One way to design the precoding matrix is to use a linear precoding scheme, where the precoding matrix is chosen to reduce the interference caused by the channel response. In some cases, in linear precoding, the precoding matrix may be computed by taking the inverse of the channel response matrix, $P=H^{-1}$, which may act to pre-compensate the transmitted signals to account for the effects of the channel so the received signal may be more accurately detected and decoded by the receiver. Non-linear precoding schemes may additionally or alternatively be used in some examples.

Figure 2:
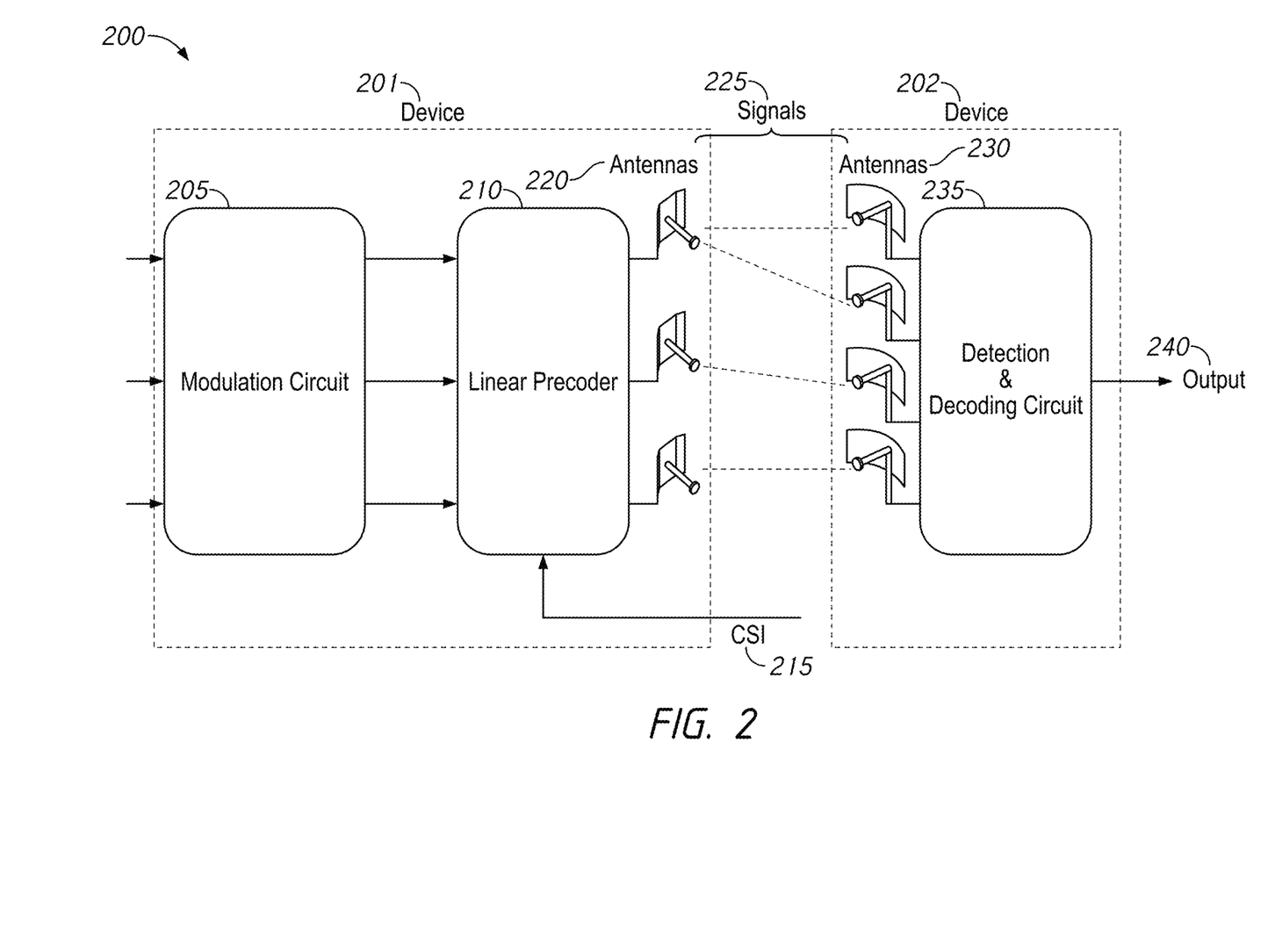
FIG. 2 is a block diagram of another communications system arranged in accordance with examples described herein.

FIG. 2 is a block diagram of a communications system 200 using MIMO communications operating in accordance with examples described herein. The communications system 200 may include a modulation circuit 205 coupled to a linear precoder 210. The linear precoder 210 may receive channel state information (CSI) 215 (e.g., at the transmitter (e.g., CSIT)). The linear precoder 210 may be coupled to one or more antennas 220, which may be configured to transmit signals 225 to antennas 230. The antennas 230 may be coupled to a detection and decoding component 235. The detection and decoding component 235 may be configured to provide an output 240. In some examples, device 201 may be a memory controller, and device 202 may be a memory device, or vice versa. In some examples, the device comprising the linear precoder 210 may include a transmitter coupled to the antennas 220, and the device comprising the detection and decoding component 235 may comprise a receiver coupled to the antennas 230.

Modulation circuit 205 may convert received information into a format suitable for transmission over a communication channel (e.g., signals 225). This may involve encoding the information onto a carrier signal that can be transmitted through the channel. The modulation circuit 205 may use different modulation schemes, such as amplitude modulation, frequency modulation, phase modulation, or combinations thereof, depending on the requirements of the communications system 200. The modulation circuit 205 may include error correction coding to improve the reliability of the transmitted information in some cases. Modulation circuit 205 may provide the converted information to linear precoder 210.

The linear precoder 210 may use CSI (e.g., CSIT) to determine an optimal precoding matrix to transform data (e.g., from modulation circuit 205) before transmission. The CSI may provide information about the channel response between the transmitter and receiver, and may be obtained by transmitting a pilot signal from the transmitter and measuring the received pilot signal at the receiver.

Pilot signals may be used to estimate the CSI between the transmitter and receiver (e.g., between the device comprising the linear precoder 210 and the device comprising the detection and decoding circuit 235). The pilot signals may be transmitted by the transmitter to the receiver over a MIMO channel. The receiver may use the received pilot signals to estimate the channel response (e.g., H from Equation 1) between the transmitter and receiver. Once the channel response is estimated, the receiver may transmit the estimated CSI back to the transmitter, which may then use the estimated CSI to compute a precoding matrix (e.g., $P=H^{-1}$) (e.g., at linear precoder 210). The pilot signals may be transmitted in different ways, depending on the MIMO system and the application. For example, in a time-division duplex (TDD) MIMO system, the pilot signals may be transmitted in the uplink direction during a dedicated time slot, while in a frequency-division duplex (FDD) MIMO system, the pilot signals may be transmitted in a separate frequency band. The transmission of pilot signals from the transmitter to the receiver may be performed using a separate channel from the data channel (e.g., signals 225 may be transmitted via the data channel). The pilot signals may be transmitted at a lower power level than the power level of the data signals to reduce interference and increase CSI estimation accuracy.

Once the CSI is determined by the transmitter/linear precoder 210, the linear precoder 210 may compute a matrix that transforms the data to be transmitted such that the resulting signal may be accurately received at the receiver. The precoding matrix may be computed by taking the inverse of the channel matrix, $P=H^{-1}$. Alternative methods for channel estimation at the linear precoder 210, such as neural network based methods (e.g., offline training), may be used. Antennas 220 may transmit signals 225 based on the transformed data. Non-linear precoding schemes may additionally or alternatively be used in some examples.

In some embodiments, precoder 210 may utilize neural networks to determine the channel response between a transmitter and receiver in MIMO scenarios. Neural networks may include multiple layers, including input, hidden, and output layers, and one or more sets of weights and activation functions.

To implement the neural network-based precoder, one or more datasets may be generated by simulating the MIMO channel under various conditions (e.g., simulating channel conditions), such as different antenna configurations, signal-to-noise ratios (SNRs), and channel models. The dataset includes a range of input data types, such as images, audio, or other types of data, depending on the application.

To generate the large dataset, analytical methods, empirical methods, or both, may be used. For example, the Kronecker model may assume that the channel response may be represented as the Kronecker product of two smaller matrices that represent the spatial and temporal components of the channel. The Kronecker model can be used to generate a large dataset of channel responses by randomly varying the statistical properties of the spatial and temporal components, such as the power delay profile, the spatial correlation matrix, and the antenna geometry. Other example methods may include simulating the MIMO channel using ray tracing or other simulation techniques. Ray tracing is a popular method for simulating the propagation of electromagnetic waves in complex environments, such as urban or indoor environments. The simulation involves tracing the path of the electromagnetic waves as they interact with the environment, including reflections, diffractions, and scattering. The resulting channel response may be used to generate a large dataset of channel responses by varying the environmental conditions, such as the location of the transmitter and receiver, the presence of obstacles, the frequency of operation, or combinations thereof.

During a training phase, the neural network is trained using the large dataset to generate (e.g., optimize) the weights of the neural network, thereby enabling it to learn complex nonlinear relationships between the input data and the channel response. The generation of the weights may be an iterative process, where the weights of the neurons in each layer may be generated to reduce the difference between a predicted output and a desired output.

During operation, input data is fed into the trained neural network, which computes a predicted output based on the learned weights and activation functions. The predicted output may be the channel response (or inverse), which is used to generate the precoding matrix based on a set of criteria, such as increasing the SNR at the receiver.

The use of a neural network for channel estimation in a precoder provides one or more advantages over pilot signal and CSI methods. For example, the neural network can determine relationships in the channel response, which may lead to more accurate channel estimation. Additionally, the use of a neural network reduces or eliminates the need for transmitting pilot signals and CSI, which can simplify the implementation of the MIMO system. Neural network training may be able to be done offline in some cases.

The device 202 may receive the transmitted signals 225 and may decode the signals 225 at detection and decoding circuit 235. In some cases, the device 202 may compute a decoding matrix at detection and decoding circuit 235. The device 202 may use the decoding matrix to decode the received signal to recover the transmitted data. Device 202 may provide output 240 based on the transmitted data.

Figure 3:
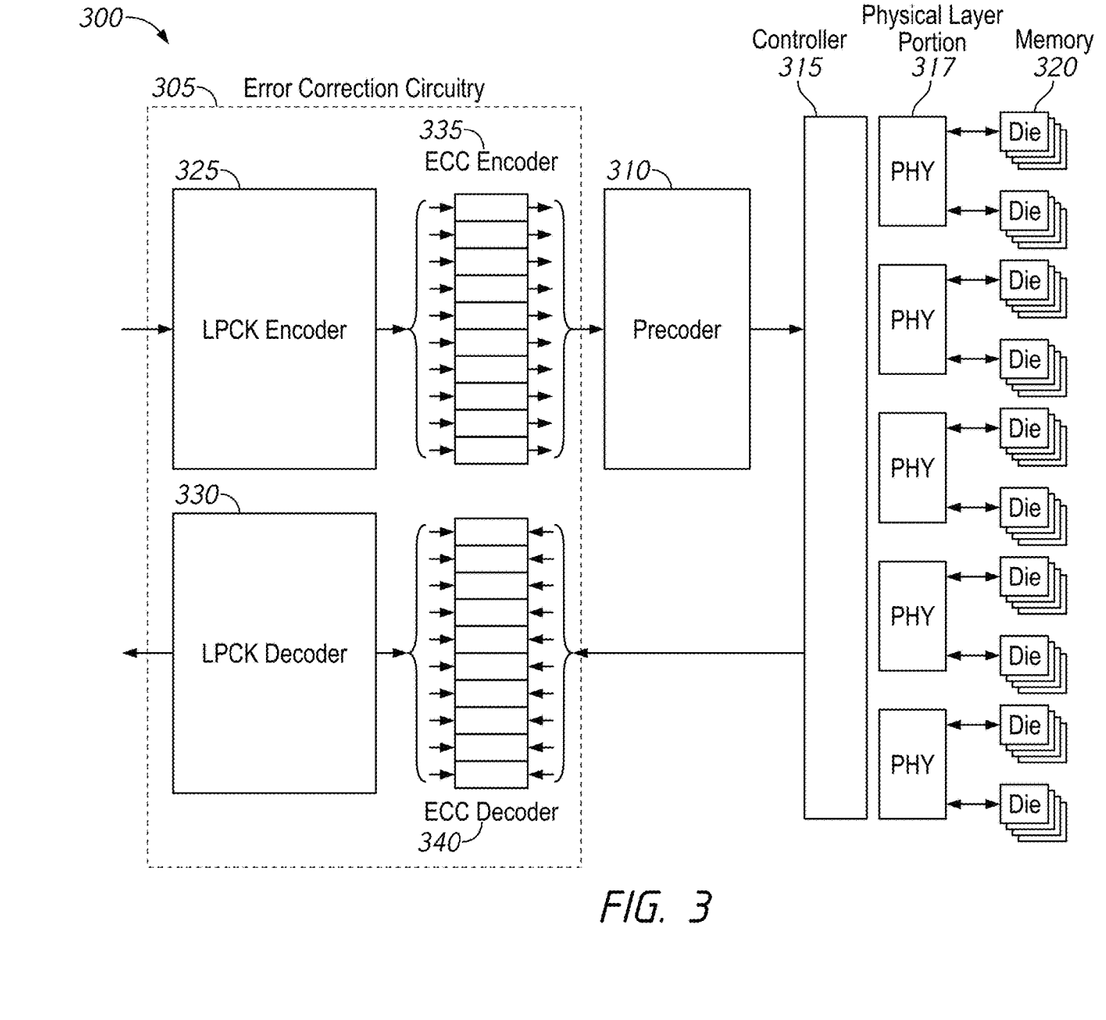
FIG. 3 is a block diagram of a memory controller arranged in accordance with examples described herein.

FIG. 3 is a block diagram of a memory controller 300 according to various examples of the disclosure. The memory controller 300 may include error correction circuitry 305, a precoder 310, a controller 315, a physical layer (PHY) portion 317, and memory 320. The memory 320 may be non-volatile or volatile memory. Error correction circuitry 305 may be coupled to precoder 310, and precoder 310 may be coupled to controller 315. Controller 315 and PHY portion 317 may be referred to as a backend, and may be coupled to memory 320, which may include one or more memory dies.

In some embodiments, the error correction circuitry 305 may implement low power chip kill (LPCK) error correction. The term "chip kill" used herein refers to a form of error correction that protects memory systems from a single memory chip failure, as well as multi-bit errors from any part of a single memory chip. One approach for chip kill protection may be on-the-fly correction implementation, which may form several codewords out of four (4)-bit symbols from each of the plurality of dies (e.g., memory chips). For instance, if there are eleven (11) dies, each containing four separate bit symbols, and each bit symbol containing four bits, the eleven dies may form four codewords, each with eleven separate bit symbols comprising a total of forty-four (44) bits per codeword. The LPCK encoder 325 may add additional redundant bits to received data to protect against single chip failures and multi-bit errors. The LPCK decoder 330 may use the redundant bits added by the LPCK encoder 325 to detect and correct any errors that may have occurred during data transmission or storage, when data is read from memory 320. If the decoder detects an error, it may use the redundant bits to identify the location of the error and correct it.

The LPCK encoder 325 may provide the encoded bits to the ECC encoder 335 to add additional redundant bits to the data that is being stored in memory 320, in addition to the redundant bits already added by the LPCK encoder 325. ECC encoders may provide an additional layer of error correction to the data, beyond what is provided by the LPCK encoder 325. ECC codes used by the ECC encoder may include Hamming codes, Reed-Solomon codes, Bose-Chaudhuri-Hocquenghem (BCH) codes, or combinations thereof. Accordingly, the ECC decoder 340 may use the redundant bits added by the ECC encoder 335 to detect and correct any errors that may have occurred during data transmission or storage (e.g., in memory 320).

Precoder 310 may be configured to precode data received from error correction module 305 before transmission to controller 315. Controller 315 and PHY portion 317 may be referred to as a backend. Precoder 310 may utilize one or more of the features recited with respect to linear precoder 210 as described in FIG. 2, and thus such descriptions will be omitted here for brevity. Non-linear precoding schemes may additionally or alternatively be used in some examples. Precoder 310 may provide precoded data to the backend (e.g., controller 315, PHY portion 317) for transmission to the memory 320 (e.g., received by a receiver (not pictured)) via MIMO transmission via a transmitter (not pictured) on the memory controller 300. The transmitter may be similar to transceiver 115 in FIG. 1 (or transmitters described in FIG. 2), and the receiver may be similar to transceiver 120 (or receivers described in FIG. 2) and may comprise one or more antennas. The memory controller 300 (and associated precoder 310) may use one or more techniques from FIG. 2 and associated linear precoder 210, including methods using pilot signals, CSI, and/or neural networks to determine a precoding matrix for transmission.

Figure 4:
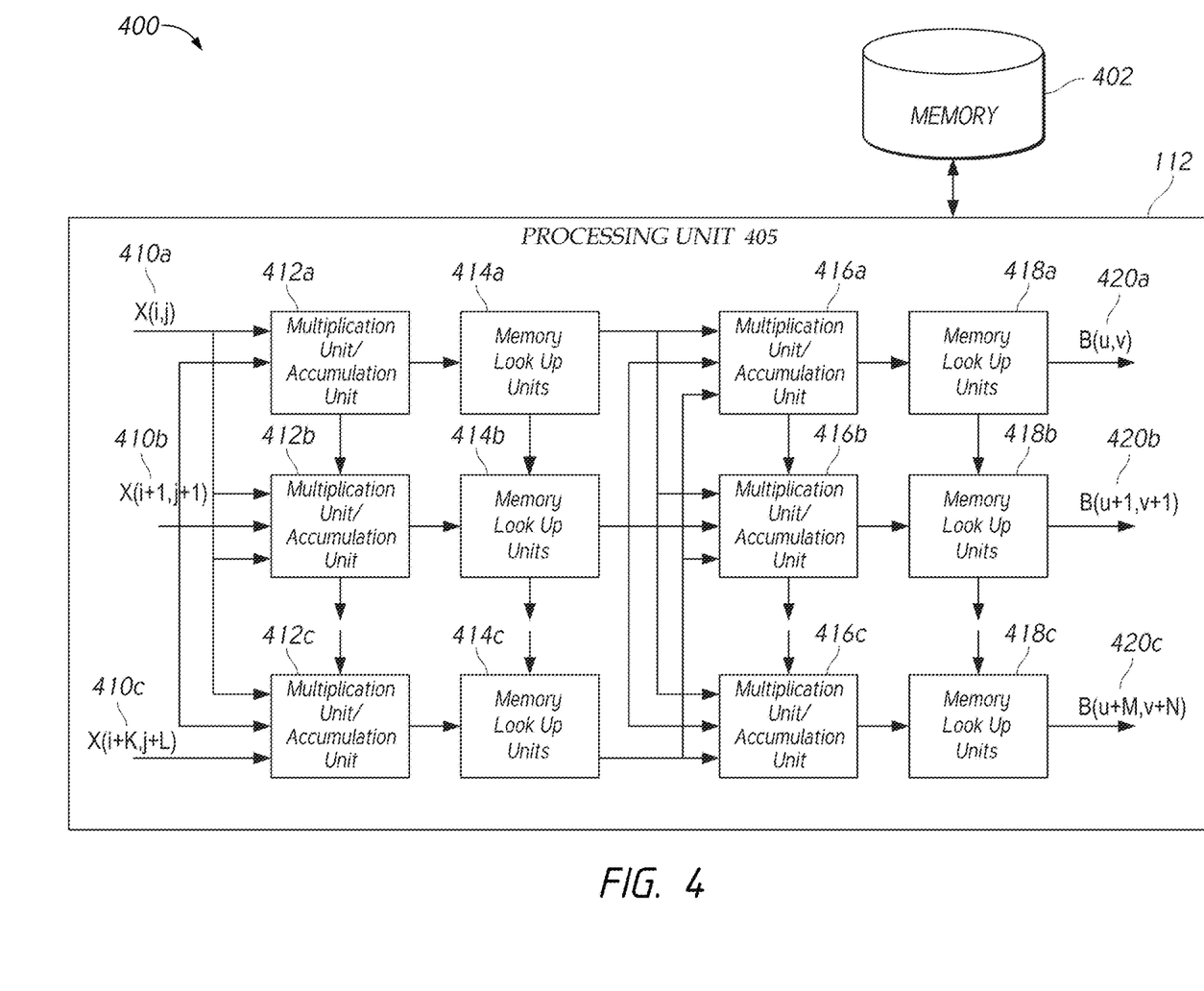
FIG. 4 is a block diagram of a processing unit arranged in a computing system in accordance with examples described herein.

FIG. 4 is a block diagram of a processing unit 405 arranged in a computing system 400 in accordance with examples described herein. In some examples, one or more processing units 111 may include processing unit 405. In some other examples, processing unit 405 or other processing units 111 may be located elsewhere, such as outside of memory controller 105. In some examples, memory device 110 may include memory 402. In some other examples, memory 402 may be a separate memory module, such as a cache. The processing unit 405 may receive input data (e.g. X (i,j)) 410a-c from a computing system. In some examples, the input data 410a-c may be input data, such as data received from a sensor or data stored in the memory 402. For example, data stored in the memory 402 may be output data generated by one or more processing units implementing another processing stage. The processing unit 405 may include multiplication unit/accumulation units 412a-c, 416a-c and memory lookup units 414a-c, 418a-c that, when mixed with weight data retrieved from the memory 402, may generate output data (e.g. B (u,v)) 420a-c. In some examples, the output data 420a-c may be utilized as input data for another processing stage or as output data to be transmitted via an antenna.

In implementing one or more processing units 405, a computer-readable medium at an electronic device that includes processing unit 405 may execute respective control instructions to perform operations through executable instructions within a processing unit 405. For example, the control instructions provide instructions to the processing unit 405, that when executed, cause the processing unit 405 to configure the multiplication units 412a-c to multiply input data 410a-c with weight data and accumulation units 416a-c to accumulate processing results to generate the output data 420a-c.

The multiplication unit/accumulation units 412a-c, 416a-c multiply two operands from the input data 410a-c to generate a multiplication processing result that is accumulated by the accumulation unit portion of the multiplication unit/accumulation units 412a-c, 416a-c. The multiplication unit/accumulation units 412a-c, 416a-c adds the multiplication processing result to update the processing result stored in the accumulation unit portion, thereby accumulating the multiplication processing result. For example, the multiplication unit/accumulation units 412a-c, 416a-c may perform a multiply-accumulate operation such that two operands, M and N, are multiplied and then added with P to generate a new version of P that is stored in its respective multiplication unit/accumulation units. The memory look-up units 414a-c, 418a-c retrieve weight data stored in memory 402. For example, the memory look-up unit can be a table look-up that retrieves a specific weight. The output of the memory look-up units 414a-c, 418a-c is provided to the multiplication unit/accumulation units 412a-c, 416a-c that may be utilized as a multiplication operand in the multiplication unit portion of the multiplication unit/accumulation units 412a-c, 416a-c. Using such a circuitry arrangement, the output data (e.g. B (u,v)) 420a-c may be generated from the input data (e.g. X (i,j)) 410a-c.

In some examples, weight data, for example from memory 402, can be mixed with the input data X (i,j) 410a-c to generate the output data B (u,v) 420a-c. The relationship of the weight data to the output data B (u,v) 420a-c based on the input data X (i,j) 410a-c may be expressed as:

$$B(u, v) = f\left(\sum_{m,n}^{M,N} a''_{m,n} f\left(\sum_{k,l}^{K,L} a'_{k,l} X(i+k, j+l)\right)\right)$$ Equation 4 where $a'_{k,l}$, $a''_{m,n}$ are weights for the first set of multiplication/accumulation units 412a-c and second set of multiplication/accumulation units 416a-c, respectively, and where f(•) stands for the mapping relationship performed by the memory look-up units 414a-c, 418a-c. As described above, the memory look-up units 414a-c, 418a-c retrieve weights to mix with the input data. Accordingly, the output data may be provided by manipulating the input data with multiplication/accumulation units using a set of weights stored in the memory associated with a desired wireless protocol. The resulting mapped data may be manipulated by additional multiplication/accumulation units using additional sets of weights stored in the memory associated with the desired wireless protocol. The sets of weights multiplied at each stage of the processing unit 405 may represent or provide an estimation of the processing of the input data in specifically-designed hardware (e.g., an FPGA).

Further, it can be shown that the system 400, as represented by Equation 4, may approximate any nonlinear mapping with arbitrarily small error in some examples and the mapping of system 400 is determined by the weights $a'_{k,l}$, $a''_{m,n}$. For example, if such weight data is specified, any mapping and processing between the input data X (i,j) 410a-c and the output data B (u,v) 420a-c may be accomplished by the system 400. Such a relationship, as derived from the circuitry arrangement depicted in system 400, may be used to train an entity of the computing system 400 to generate weight data. For example, using Equation 4, an entity of the computing system 400 may compare input data to the output data to generate the weight data.

In the example of system 400, the processing unit 405 mixes the weight data with the input data X (i,j) 410a-c utilizing the memory look-up units 414a-c, 418a-c. In some examples, the memory look-up units 414a-c, 418a-c can be referred to as table look-up units. The weight data may be associated with a mapping relationship for the input data X (i,j) 410a-c to the output data B (u,v) 420a-c. For example, the weight data may represent non-linear mappings of the input data X (i,j) 410a-c to the output data B (u,v) 420a-c. In some examples, the non-linear mappings of the weight data may represent a Gaussian function, a piece-wise linear function, a sigmoid function, a thin-plate-spline function, a multi-quadratic function, a cubic approximation, an inverse multi-quadratic function, or combinations thereof. In some examples, some or all of the memory look-up units 414a-c, 418a-c may be deactivated. For example, one or more of the memory look-up units 414a-c, 418a-c may operate as a gain unit with the unity gain. In such a case, the instructions may be executed to facilitate selection of a unity gain processing mode for some or all of the memory look-up units 414a-c, 418a-c.

Each of the multiplication unit/accumulation units 412a-c, 416a-c may include multiple multipliers, multiple accumulation units, or and/or multiple adders. Any one of the multiplication unit/accumulation units 412a-c, 416a may be implemented using an ALU. In some examples, any one of the multiplication unit/accumulation units 412a-c, 416a-c can include one multiplier and one adder that each perform, respectively, multiple multiplications and multiple additions. The input-output relationship of a multiplication/accumulation unit 412a-c, 416a-c may be represented as:

$$B_{out} = \sum_{i=1}^{I} C_i * B_{in}(i)$$ Equation 5 where "I" represents a number to perform the multiplications in that unit, $C_i$ the weights which may be accessed from a memory, such as memory 402, and $B_{in}(i)$ represents a factor from either the input data X (i,j) 410a-c or an output from multiplication unit/accumulation units 412a-c, 416a-c. In an example, the output of a set of multiplication unit/accumulation units, $B_{out}$, equals the sum of weight data, $C_i$ multiplied by the output of another set of multiplication unit/accumulation units, $B_{in}(i)$. $B_{in}(i)$ may also be the input data such that the output of a set of multiplication unit/accumulation units, $B_{out}$, equals the sum of weight data, $C_i$ multiplied by input data.

Figure 5:
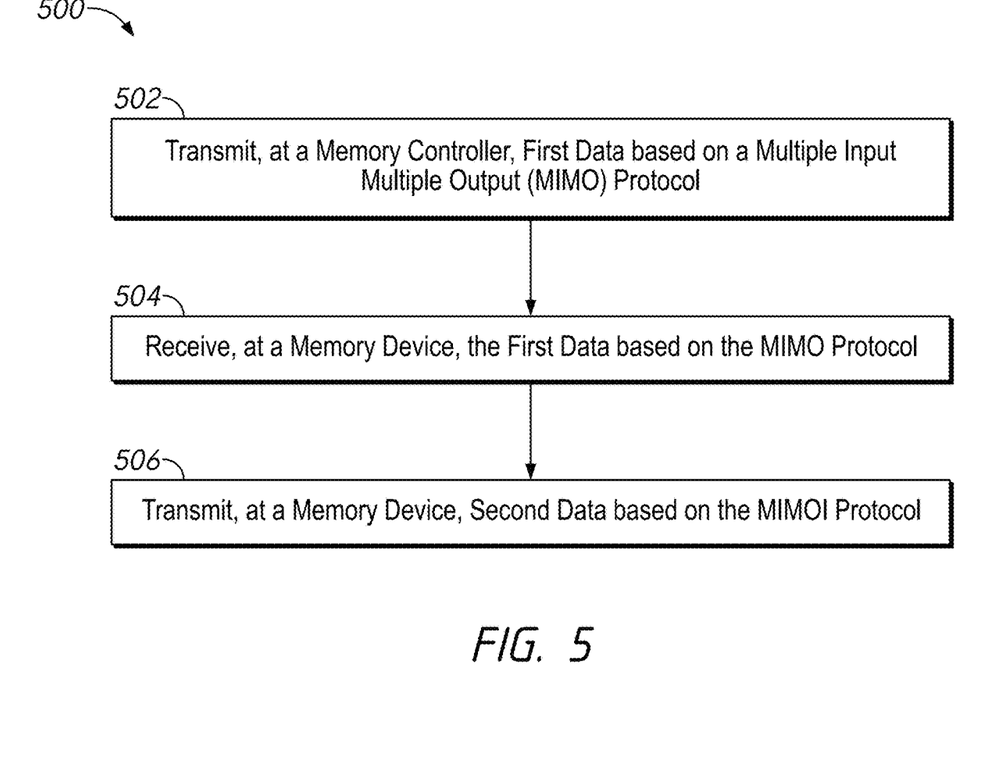
FIG. 5 is a flowchart of a method arranged in accordance with examples described herein.

FIG. 5 is a flowchart of a method 500 in accordance with examples described herein. Example method 500 may be implemented using, for example, communications system 100 in FIG. 1, communications system 200 in FIG. 2, memory controller 300 in FIG. 3, or any system or combination of the systems depicted in FIGS. 1-3 described herein. The operations described in blocks 502-506 may also be stored as control instructions in a computer-readable medium at memory controller 105 or memory device 110. In some examples, the method 500 may be implemented in a non-transitory computer readable medium including instructions executable to cause a wireless communication device to perform one or more of the operations of the method 500.

The method 500 may include transmitting, at a memory controller, first data based on a MIMO protocol, at 502. The memory controller may include the memory controller 105 of FIG. 1, the device 201 of FIG. 2, the memory controller 300 of FIG. 3, or any combination thereof, in some examples. In some examples, the method 500 may include transmitting, by the memory controller, a pilot signal to a memory device, receiving CSI from the memory device based at least in part on the pilot signal, and determining a precoding matrix based at least in part on the CSI. The memory device may include the memory device 110 of FIG. 1 and/or the device 202 of FIG. 2, in some examples. The precoding matrix may be determined by a precoder, such as the linear precoder 210 of FIG. 2 and/or the precoder 310 of FIG. 3. In some examples, the CSI includes information associated with one or more channels between the memory controller circuit and the memory device. The precoding matrix may be designed to improve the system performance by taking into account the channel response matrix and the system requirements. One way to design the precoding matrix is to use a linear precoding scheme, where the precoding matrix is chosen to reduce the interference caused by the channel response. In some cases, in linear precoding, the precoding matrix may be computed by taking the inverse of the channel response matrix, P=H−1, which may act to pre-compensate the transmitted signals to account for the effects of the channel so the received signal may be more accurately detected and decoded by the receiver.

In some examples, the method 500 may include applying the precoding matrix to the first data, and transmitting the precoded first data. Precoding may involve multiplying the first data by the precoding matrix before they are transmitted. In some examples, the precoding matrix is an inverse of a matrix representing a channel response of one or more channels between the memory controller circuit and the memory device. In some examples, the method 500 may include using a neural network to determine the precoding matrix. In some examples, the neural network may be implemented via a processing unit, such as the processing unit 405 of FIG. 4. In some examples, the method 500 may include applying the precoding matrix to the first data, and transmitting the precoded first data. In some examples, the neural network is trained based on one or more datasets that represent channel conditions of one or more channels between the memory controller circuit and the memory device.

The method 500 may include receiving, at the memory device, the first data based on the MIMO protocol, at 504. In some examples, the method 500 may include storing the first data in a plurality of memory cells of the memory device after receiving the first data.

The method 500 may include transmitting, at the memory device, second data based on the MIMO protocol, at 506.

The steps 502, 504, and 506 of the method 500 are for illustration purposes. In some examples, the steps 502, 504, and 506 may be performed in a different order. In some other examples, various steps 502, 504, and 506 may be eliminated. In still other examples, various steps 502, 504, and 506 may be divided into additional steps, supplemented with other steps, or combined together into fewer steps. Other variations of these specific steps are contemplated, including changes in the order of the steps, changes in the content of the steps being split or combined into other steps, etc.

Figure 6:
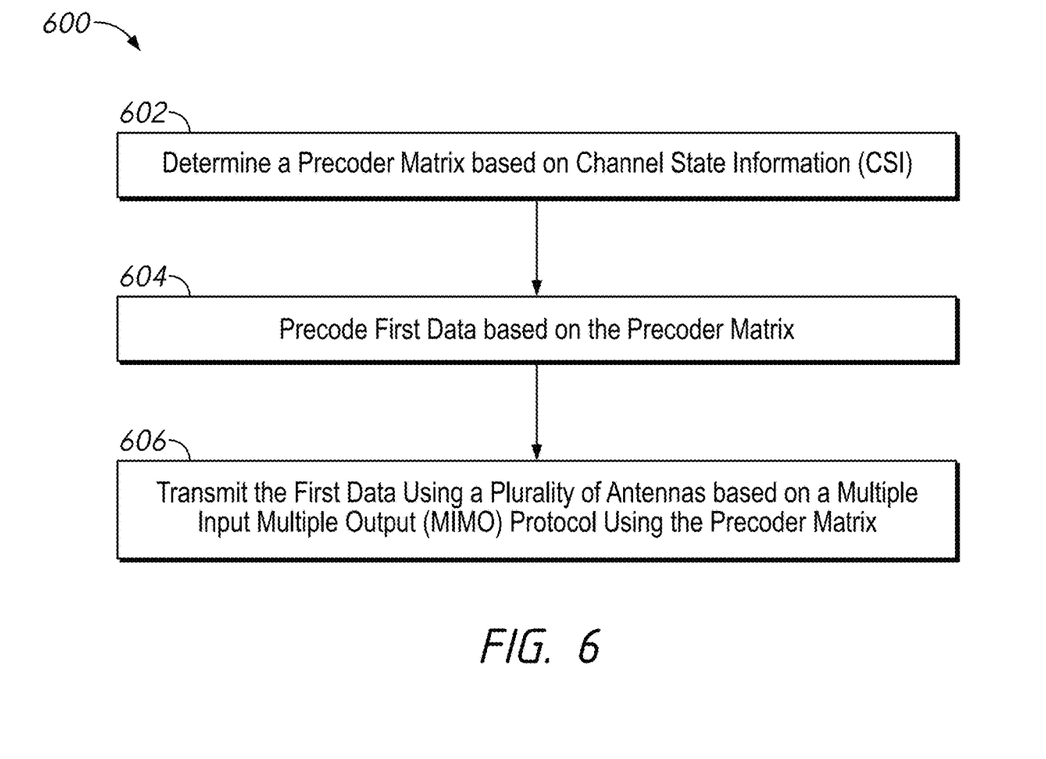
FIG. 6 is a flowchart of another method arranged in accordance with examples described herein.

FIG. 6 is a flowchart of a method 600 in accordance with examples described herein. Example method 600 may be implemented using, for example, communications system 100 in FIG. 1, communications system 200 in FIG. 2, memory controller 300 in FIG. 3, or any system or combination of the systems depicted in FIGS. 1-3 described herein. The operations described in blocks 602-606 may also be stored as control instructions in a computer-readable medium at memory controller 105 or memory device 110. In some examples, the method 600 may be implemented in a non-transitory computer readable medium including instructions executable to cause a wireless communication device to perform one or more of the operations of the method 600.

The method 600 may include determining, at a precoder circuit, a precoder matrix based on CSI, at 602. The precoder circuit may include the linear precoder 210 of FIG. 2 and/or the precoder 310 of FIG. 3. The precoding matrix may be designed to improve the system performance by taking into account the channel response matrix and the system requirements. One way to design the precoding matrix is to use a linear precoding scheme, where the precoding matrix is chosen to reduce the interference caused by the channel response. In some cases, in linear precoding, the precoding matrix may be computed by taking the inverse of the channel response matrix, $P=H-1$, which may act to pre-compensate the transmitted signals to account for the effects of the channel so the received signal may be more accurately detected and decoded by the receiver. In some examples, the method 600 may include generating an output stream with one or more redundant bits to provide first data to the precoder circuit. In some examples, the CSI includes information associated with one or more channels between a memory controller circuit and a memory device. In some examples, the precoding matrix is an inverse of a matrix representing a channel response of one or more channels between the memory controller circuit and a memory device.

The method 600 may include precoding, at the precoder circuit, the first data based on the precoder matrix, at 604. In some examples, the method 600 may include applying the precoding matrix to the first data. For example, precoding may involve multiplying the first data by the precoding matrix before they are transmitted.

The method 600 may include transmitting the first data using a plurality of antennas (e.g., the antennas 125 of FIG. 1 and/or the antennas 220 of FIG. 2) based on a MIMO protocol using the precoder matrix, at 606.

The steps 602, 604, and 606 of the method 600 are for illustration purposes. In some examples, the steps 602, 604, and 606 may be performed in a different order. In some other examples, various steps 602, 604, and 606 may be eliminated. In still other examples, various steps 602, 604, and 606 may be divided into additional steps, supplemented with other steps, or combined together into fewer steps. Other variations of these specific steps are contemplated, including changes in the order of the steps, changes in the content of the steps being split or combined into other steps, etc.

Figure 7:
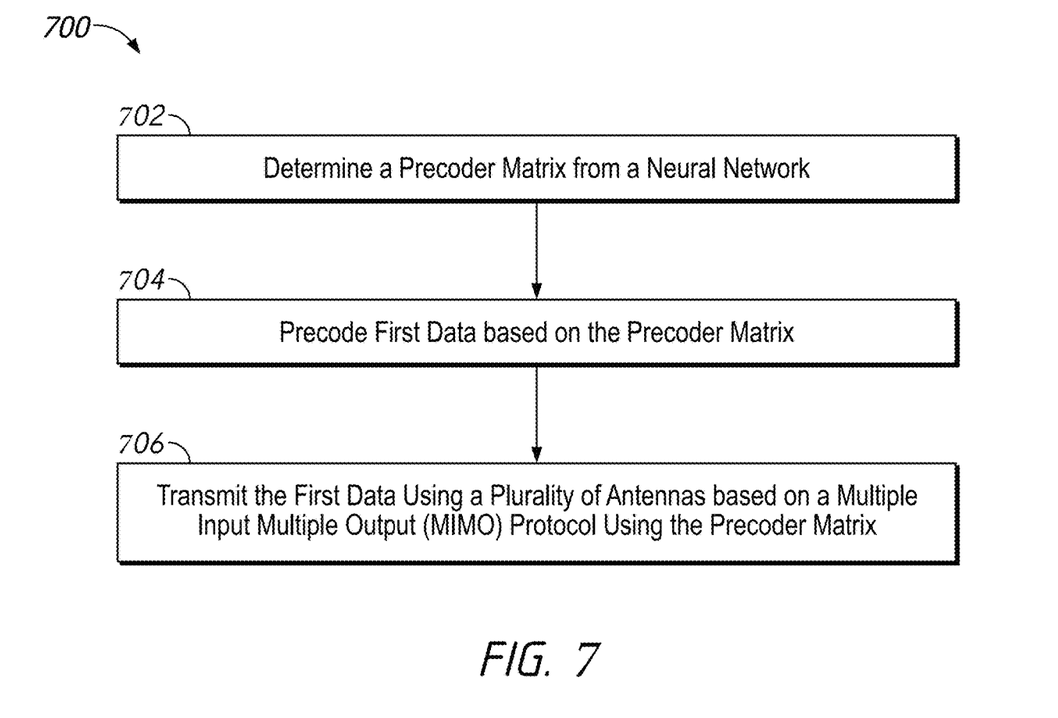
FIG. 7 is a flowchart of another method arranged in accordance with examples described herein.

FIG. 7 is a flowchart of a method 700 in accordance with examples described herein. Example method 700 may be implemented using, for example, communications system 100 in FIG. 1, communications system 200 in FIG. 2, memory controller 300 in FIG. 3, or any system or combination of the systems depicted in FIGS. 1-3 described herein. The operations described in blocks 702-706 may also be stored as control instructions in a computer-readable medium at memory controller 105 or memory device 110. In some examples, the method 700 may be implemented in a non-transitory computer readable medium including instructions executable to cause a wireless communication device to perform one or more of the operations of the method 700.

The method 700 may include determining a precoder matrix from a neural network, at 702. The precoding matrix may be determined by a precoder, such as the linear precoder 210 of FIG. 2 and/or the precoder 310 of FIG. 3. The precoding matrix may be designed to improve the system performance by taking into account the channel response matrix and the system requirements. One way to design the precoding matrix is to use a linear precoding scheme, where the precoding matrix is chosen to reduce the interference caused by the channel response. In some cases, in linear precoding, the precoding matrix may be computed by taking the inverse of the channel response matrix, $P=H-1$, which may act to pre-compensate the transmitted signals to account for the effects of the channel so the received signal may be more accurately detected and decoded by the receiver. In some examples, the method 700 may include generating an output stream with one or more redundant bits to provide first data to the precoder circuit. In some examples, the neural network is trained based on one or more datasets that represent channel conditions of one or more channels between a memory controller circuit (e.g., the memory controller 105 of FIG. 1, the device 201 of FIG. 2, the memory controller 300 of FIG. 3, or any combination thereof) and a memory device (e.g., the memory device 110 of FIG. 1 and/or the device 202 of FIG. 2).

The method 700 may include precoding first data based on the precoder matrix, at 704. In some examples, the method 700 may include applying the precoding matrix to the first data. For example, precoding may involve multiplying the first data by the precoding matrix before they are transmitted.

The method 700 may include transmitting the first data using a plurality of antennas (e.g., the antennas 125 of FIG. 1 and/or the antennas 220 of FIG. 2) based on a MIMO protocol using the precoder matrix, at 706.

The steps 702, 704, and 706 of the method 700 are for illustration purposes. In some examples, the steps 702, 704, and 706 may be performed in a different order. In some other examples, various steps 702, 704, and 706 may be eliminated. In still other examples, various steps 702, 704, and 706 may be divided into additional steps, supplemented with other steps, or combined together into fewer steps. Other variations of these specific steps are contemplated, including changes in the order of the steps, changes in the content of the steps being split or combined into other steps, etc.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A system, comprising:
a memory controller circuit configured to transmit first data based on a multiple input multiple output (MIMO) protocol; and
a memory device configured to receive the first data based on the MIMO protocol, and configured to transmit second data to the memory controller circuit based at least in part on the MIMO protocol.

2. The system of claim 1, wherein the memory controller circuit is further configured to transmit a pilot signal to the memory device, receive channel state information (CSI) from the memory device based at least in part on the pilot signal, and determine a precoding matrix based at least in part on the CSI.

3. The system of claim 2, wherein the CSI includes information associated with one or more channels between the memory controller circuit and the memory device.

4. The system of claim 2, wherein the memory controller is further configured to apply the precoding matrix to the first data, and transmit the precoded first data.

5. The system of claim 2, wherein the precoding matrix is an inverse of a matrix representing a channel response of one or more channels between the memory controller circuit and the memory device.

6. The system of claim 1, wherein the memory controller is further configured to use a neural network to determine a precoding matrix.

7. The system of claim 6, wherein the memory controller is further configured to apply the precoding matrix to the first data, and transmit the precoded first data.

8. The system of claim 6, wherein the neural network is trained according to one or more datasets that represent channel conditions of one or more channels between the memory controller circuit and the memory device.

9. The system of claim 1, wherein the memory device comprises a plurality of memory cells, and wherein the memory device is further configured to store the first data in the plurality of memory cells after receiving the first data.

10. The system of claim 1, wherein the memory controller and the memory device are located on a same device.

11. The system of claim 1, wherein the memory controller and the memory device are located on different devices.

12. A memory controller circuit, comprising:
a precoder circuit configured to precode first data based on a precoding matrix determined based on channel state information (CSI), and configured to provide precoded first data; and
a transmitter circuit comprising a plurality of antennas, the transmitter circuit configured to receive the first data from the precoder circuit, and configured to transmit the first data using the plurality of antennas based on a multiple input multiple output (MIMO) protocol using the precoding matrix.

13. The memory controller circuit of claim 12, further comprising:
an error correction circuit coupled to the precoder circuit, wherein the error correction circuit is configured to generate an output stream with one or more redundant bits to provide the first data to the precoder circuit.

14. The memory controller circuit of claim 12, wherein the CSI includes information associated with one or more channels between the memory controller circuit and a memory device.

15. The memory controller circuit of claim 12, wherein the memory controller is further configured to apply the precoding matrix to the first data, and transmit the precoded first data.

16. The memory controller circuit of claim 12, wherein the precoding matrix is an inverse of a matrix representing a channel response of one or more channels between the memory controller circuit and a memory device.

17. A memory controller circuit, comprising:
a precoder circuit configured to precode first data based at least in part on a precoding matrix determined from a neural network, and further configured to provide precoded first data; and
a transmitter circuit comprising a plurality of antennas, the transmitter circuit configured to receive the first data from the precoder circuit, and further configured to transmit the first data using the plurality of antennas based at least in part on a multiple input multiple output (MIMO) protocol using the precoding matrix.

18. The memory controller circuit of claim 17, further comprising:
an error correction circuit coupled to the precoder circuit, wherein the error correction circuit is configured to generate an output stream with one or more redundant bits to provide the first data to the precoder circuit.

19. The memory controller circuit of claim 17, wherein the memory controller is further configured to apply the precoding matrix to the first data, and transmit the precoded first data.

20. The memory controller circuit of claim 17, wherein the neural network is trained according to one or more datasets that represent channel conditions of one or more channels between the memory controller circuit and a memory device.

* * * * *